United States Patent [19]

Osborne

[11] Patent Number: 4,966,007
[45] Date of Patent: Oct. 30, 1990

[54] ABSORPTION REFRIGERATION METHOD AND APPARATUS

[75] Inventor: William T. Osborne, Severn, Md.

[73] Assignee: Baltimore Aircoil Company, Inc., Jessup, Md.

[21] Appl. No.: 351,067

[22] Filed: May 12, 1989

[51] Int. Cl.$^5$ ............................................. F25B 15/00
[52] U.S. Cl. ...................................... 62/101; 62/476; 62/488
[58] Field of Search .................. 62/476, 335, 101, 488

[56] References Cited

U.S. PATENT DOCUMENTS

| | | | |
|---|---|---|---|
| 3,138,938 | 6/1964 | Beardslee | 62/488 X |
| 3,320,760 | 5/1967 | Swearingen | |
| 3,360,950 | 1/1968 | Osborne | |
| 3,651,655 | 3/1972 | Dyre | 62/141 |
| 3,742,726 | 7/1973 | English | 62/333 |
| 3,742,727 | 7/1973 | Kaiser | 62/487 |
| 3,745,780 | 7/1973 | Leonard | 62/141 |
| 3,824,804 | 7/1974 | Sandmark | 62/335 X |
| 4,085,596 | 4/1978 | Miyamoto et al. | 62/476 |
| 4,100,755 | 7/1978 | Leonard | 62/148 X |
| 4,246,762 | 1/1981 | Bourne | 62/148 |
| 4,269,041 | 5/1981 | Holldorff | 62/476 |
| 4,337,625 | 7/1982 | Wilkinson | 62/79 |
| 4,448,040 | 5/1984 | Kunugi | 62/238.3 |
| 4,471,630 | 9/1984 | Sugimoto et al. | 62/476 X |
| 4,513,584 | 4/1985 | Woyke | 62/235.1 |
| 4,724,679 | 2/1988 | Radermacher | 62/101 |
| 4,823,864 | 4/1989 | Rockenfeller | 165/104.12 |

Primary Examiner—Lloyd L. King
Attorney, Agent, or Firm—Charles E. Bouton; Edward J. Brosius

[57] ABSTRACT

An absorption refrigeration method and apparatus having concentrator and evaporator phases operated at substantially equal pressure and wherein the concentrator phase utilizes a mechanically driven heat pump to concentrate absorbent solution and to condense the diluent.

19 Claims, 2 Drawing Sheets

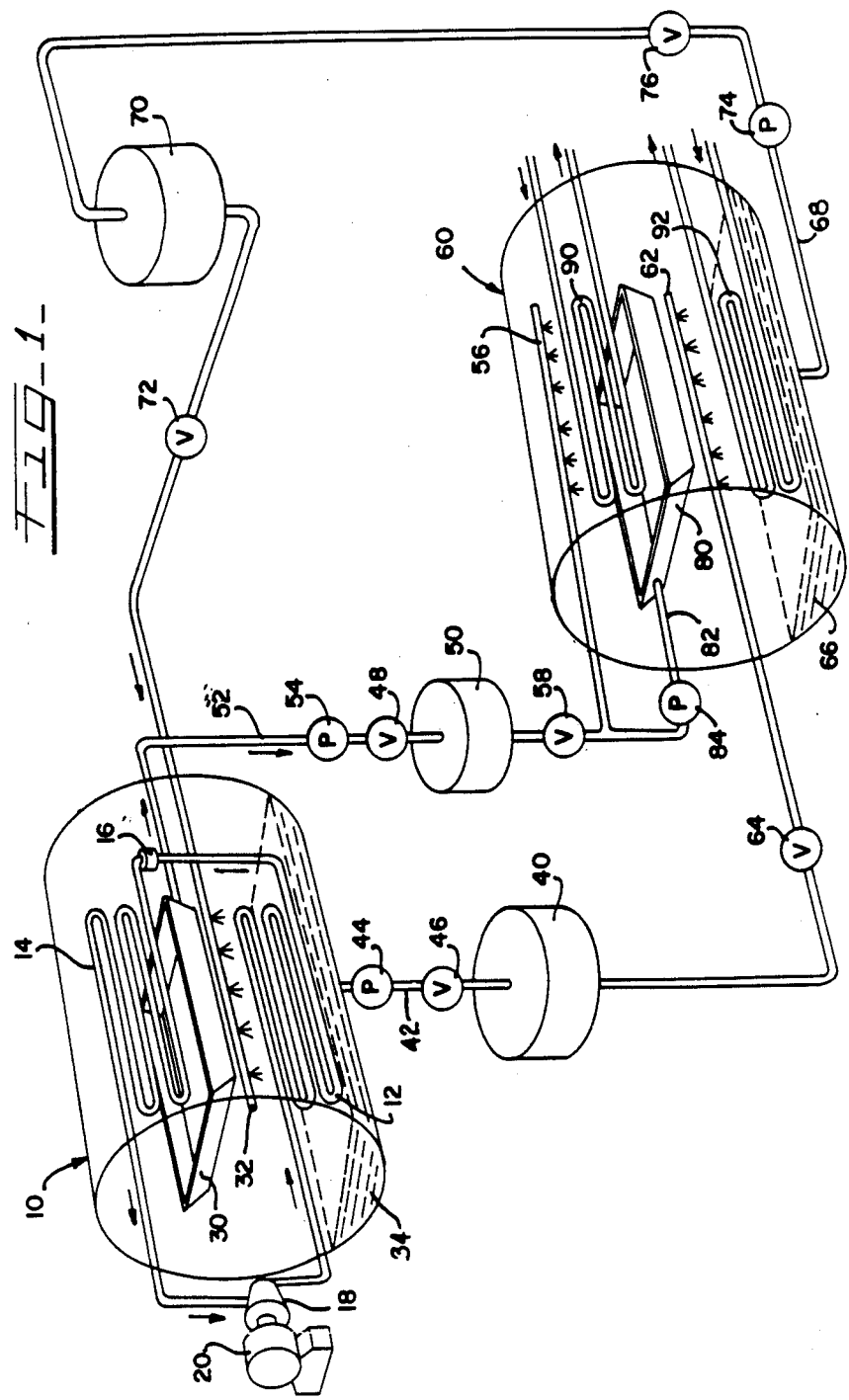

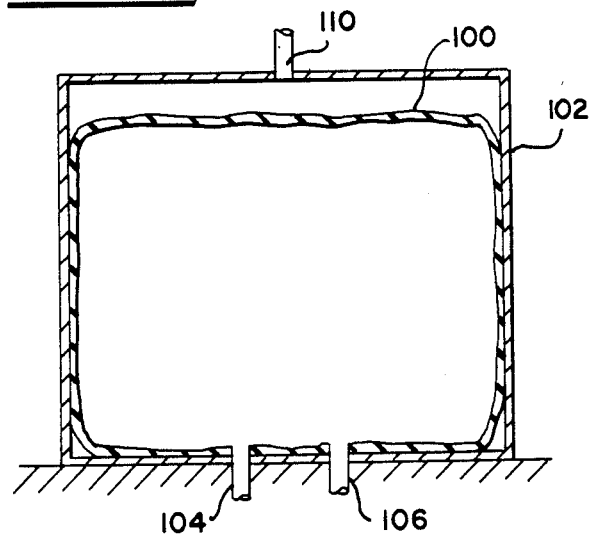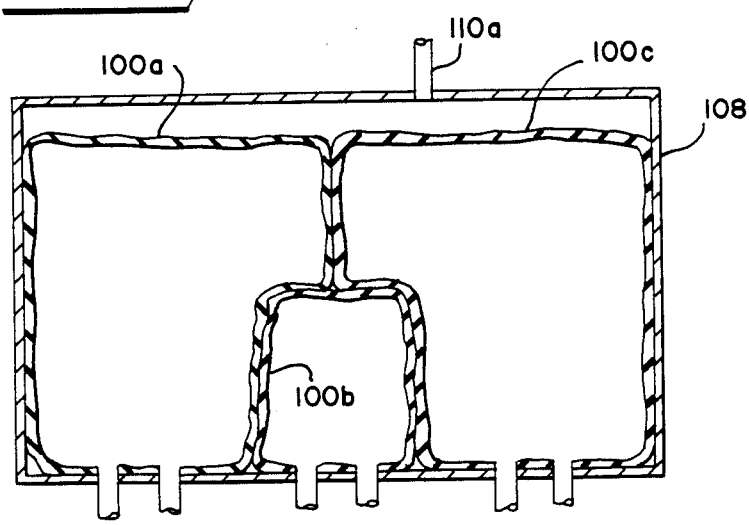

ABSORPTION REFRIGERATION METHOD AND APPARATUS

The present invention relates to absorption refrigeration and more specifically deals with an improved method and apparatus to more efficiently concentrate an absorption fluid.

BACKGROUND OF THE INVENTION

Absorption refrigeration systems, which are driven by heat energy, have been long known and indeed predate mechanical expansion refrigeration; but the latter has become more prevalent due to abundant and inexpensive electrical energy and the discovery and commercial production of fluorinated hydrocarbon refrigerant gases. However, increasing costs for electrical energy, especially during high demand portions of a calendar day, and environmental concerns associated with fluorinated hydrocarbons are creating opportunities for absorption refrigeration.

In an absorption refrigeration cycle a liquid solution, such as lithium bromide in water, is concentrated in a first phase by heating to drive off a portion of a diluent component (water) and the concentrated solution is delivered to a second absorber phase where it absorbs or reabsorbs that component so as to become diluted. Thus, the diluent component (such as water) is available between phases to take up heat removed from a load (such as refrigerated or cooled space) so as to produce a diluent vapor and that vapor is then absorbed by the concentrated solution which, upon becoming diluted is returned to the first phase to be reconcentrated.

Heretofore absorption refrigeration systems have been relatively inefficient and inflexible because they have largely relied on the refrigeration effect of an expandable absorption component and the requisite heat energy has been supplied either by unreliable waste heat or by a burning flame of expensive fuels; and the respective concentrator and absorber phases have not been adaptable to intermediate storage whereby the concentrator phase could be disassociated, timewise, from the absorber phase. However, in U.S. Pat. No. 4,269,041 to Gunther Holldorff, there is described an ammonia absorption refrigeration system with time separation facilitated by storage of the absorption fluids.

SUMMARY OF THE INVENTION

Accordingly, it is a principal object of the present invention to provide an absorption refrigeration method and apparatus of improved efficiency.

It is another object of the present invention to provide an absorption refrigeration method and apparatus that may utilize electrical energy as a power source.

It is still another object of the present invention to provide an absorption refrigeration method and apparatus in which a cold liquid diluent is produced in the concentrator phase and stored for subsequent use whereby the concentrator and absorber phases are disassociated so as to be operable independently of one another.

Briefly stated the present invention involves the addition of adequate storage for both concentrated and diluted liquid absorbent solutions and also for a cold liquid diluent so as to enable the concentrator phase and the evaporator phase to be operable at dissimilar rates and/or time periods. Preferably both phases are operated at relatively equal pressure whereby the diluent saturation temperatures are equal and temperature variation of the absorbent solution between phases is minimized. Thermodynamically, this equalization increases the efficiency of the cycle and eliminates the need for a costly and troublesome liquid solution heat interchanger as has heretofore been used with conventional absorption systems. Additionally, the equalization which this invention makes possible works to minimize the solution concentrations and temperatures, a combination which will reduce the corrosive characteristics of the absorbent solution. Further efficiency is gained by using a heat pump for capturing the heat released from the condensing diluent, which has heretofore been rejected to the atmosphere, and returning it to the concentration processes, thereby displacing a major portion of the raw energy normally required to power such a process. The heat pump may be driven by any convenient power means such as an electric motor or a fuel powered engine.

BRIEF DESCRIPTION OF THE DRAWINGS

Further objects and advantages of the present invention will become apparent upon reading the following detailed description in conjunction with the drawings wherein:

FIG. 1 is a schematic drawing of a preferred embodiment of the present invention wherein three liquid reservoirs are interconnected between an absorption refrigeration concentrator vessel and evaporator/absorber vessel and wherein a heat pump drives the concentrator;

FIG. 2 is a side elevation of a vessel and single reservoir for the system of FIG. 1; and FIG. 3 is a side elevation of an alternative embodiment of multiple reservoirs within a single vessel.

DETAILED DESCRIPTION

It is to be understood that in the illustrated embodiment of FIG. 1, described hereafter, certain functional parts of absorption refrigeration equipment commonly referred to as generator, condensor, absorber and evaporator are located among two vessels 10, 60 wherein the illustrated concentrator vessel 10 includes a lower generator section and an upper condensor section; and the illustrated evaporator vessel 60 includes a lower absorber section and an upper evaporator section.

The present method may be described from the step of concentrating an absorption refrigerant liquid solution, such as an aqueous solution of lithium bromide, by heating a first liquid stream of a relatively weak or diluted solution within a first concentrator phase containing generator and condensor functions to distill a diluent vapor (generator function) and therein condensing (condensor function) the vapor by cooling, thereby producing first liquid streams of relatively concentrated or strong absorbent solution (in the generator) and cold diluent (in the condensor). Aqueous solutions of lithium bromide are preferred because of favorable cost and environmental considerations, such as low toxicity. However, it will be understood that other diluent/absorbent pairs are known to satisfactorily perform in absorption refrigeration systems such as ammonia/water, water/sodium hydroxide, and water/calcium hydroxide, and may be used in the present method and apparatus.

The present method continues by storing at least portions of the separate strong solution and cold diluent liquid streams in first and second zones, respectively, against demand in a second evaporator phase containing evaporator and absorber functions where the cold liquid diluent is used for chilling a refrigeration heat exchanger connected to an air conditioning or refrigeration load, or the like. Heat transferred to the cold liquid diluent during the chilling step (evaporator function) will cause evaporation of some diluent which is thereby available for diluting a second stream of strong liquid solution (absorber function) removed from the first zone and introduced within the absorber phase, thereby producing a second liquid stream of diluted or weak solution at a rate dependent upon controlling the flow of the second liquid stream of strong solution from the first zone. The absorption cycle is closed by storing at least a portion of the second weak liquid solution stream in a third zone and subsequently withdrawing the first liquid stream of relatively weak solution therefrom and introducing same to the first concentrator phase at a rate determined by the capacity of the concentrator phase, and only during intervals when replenishing the liquids stored in the first and second zones.

Storage of quantities of each of the relatively strong and weak liquid solutions and of the liquid diluent also allows for favorable operating conditions in each of the first, concentrating, and second, absorbing, phases. With the preferred aqueous lithium bromide solutions both concentrator and evaporator phases are operated at equivalent internal pressures of 0.2 inch mercury absolute (5.1 cm. mercury absolute) which provides for a water vapor saturation temperature (condensation temperature) of about 35° F. (1.7° C.) and relatively low solution boiling temperature; whereas the operating pressure normally found in prior absorption refrigeration concentrators which reject heat to the atmosphere, is in the range of 3 inch (76.2 cm.) mercury, absolute, resulting in water vapor saturation temperatures of about 115° F. (46.1° C.) and a weak solution boiling point of about 220° F. (104.4° C.).

Accordingly by maintaining the pressure within the concentrator phase at about 0.2 inch (5.1 cm.) mercury absolute, which is accomplished largely by regulating the heat input and flow of weak absorbent liquid into the first concentrator phase, the diluent vapor (e.g. water vapor) condenses when chilled to about 35° F. (1.7° C.) and the liquid diluent condensate may be delivered at that temperature to the second storage zone. Thus the liquid water diluent is also available at about 35° F. (1.7° C.) for use as a chilling medium in the evaporator phase where it may be applied to chill a refrigeration heat exchanger containing fluid from a refrigeration system, or the like. The cold liquid diluent is introduced into the evaporator phase at a rate sufficient to meet the demand of the refrigeration system. It is often advantageous to apply and recirculate an excess of the cold liquid diluent to the refrigeration heat exchanger to insure adequate wetting of the heat transfer surface. The heat from the refrigeration heat exchanger vaporizes a portion of the diluent; and that vapor is then available to be absorbed in the second liquid stream of warm concentrated absorbent solution which is injected into the absorber phase at a rate adequate to absorb the diluent vapor generated at the refrigeration heat exchanger. Additionally the injected absorbent solution and diluent vapor are preferably cooled a few degrees by a second heat exchanger within the evaporator phase to remove the heat from the exothermic absorption process. The amount of cooling is regulated, along with the injection rate for concentrated absorbent solution, so as to maintain the pressure within the evaporator phase at an optimum level (0.2 inch mercury, absolute, in the preferred embodiment). Further, the resultant cool diluted and relatively weak liquid absorbent solution is withdrawn to the third storage zone where it is held against demand in the concentrator phase. It is intended that the concentrator phase be operated at near optimum design capacity for periods of time that may or may not be coincident with the operating cycle of the absorber phase.

Preferably heating of the first stream of relatively weak liquid absorbent solution within the first concentrator phase is most efficiently achieved by heat liberated from a condenser stage of an electric powered heat pump; and the resultant diluent vapor is condensed by the heat pump evaporator, thereby conserving the latent heat of condensation of the diluent and reinjecting it into the concentration process. That is, the concentrator phase chamber contains both the condenser and evaporator stage heat exchangers of a mechanical heat pump wherein the heat pump compressor, driven by a power means such as, an electric motor or fuel fired engine, is conveniently located outside the concentrator chamber.

A preferred system of apparatus for performing the aforedescribed method is schematically illustrated in FIG. 1 wherein a concentrator vessel 10, such as closed cylindrical tank, contains a heat pump circuit comprising a condenser coil 12 in a lower (generator) section of the vessel and an evaporator coil 14 in an upper (condenser) section of the vessel. The coils 12 and 14 are interconnected by a refrigerant expansion valve 16 and each coil is connected in the usual manner to a compressor 18 located outside the vessel. The compressor is driven by an electric motor 20. In some systems where the demands on the heat pump evaporator 14 and condenser 12 are not balanced, it may be advantageous to include an auxiliary exterior heat exchanger (not shown) outside the vessel 10. Usually where this is needed it will be connected between the compressor discharge and the condenser coil 12.

It will be seen in FIG. 1 that the concentrator vessel 10 also contains a first diluent collection pan 30, located directly beneath the evaporator coil 14, and a first absorbent solution spray header 32, located directly above the condenser coil 12. An absorbent solution sump 34 is located in the vessel 10 beneath the condenser coil 12. A first reservoir 40 is connected to the sump 34 of concentrator vessel 10 by a pipe 42, pump 44 and a check valve 46; and a second reservoir 50 is connected to the first diluent collection pan 30 by a pipe 52, pump 54 and a check valve 48.

The second reservoir 50 is also connected to a diluent spray header 56 through a variable flow control valve 58. The diluent spray header 56 is located within one (evaporator) section, usually an upper section, of an evaporator/absorber vessel 60. A second absorbent solution spray header 62 located in an adjacent, usually lower (absorber), section of the vessel 60 is connected to the first reservoir 40 through another variable flow control valve 64. A second absorbent solution sump 66 is located in the evaporator/absorber vessel 60 beneath the second spray header 62 and is connected by pipe 68 to a third reservoir 70 which, in turn, is connected through a variable flow control valve 72 to the first absorber solution spray header 32. It will be seen that a pump 74 and a check valve 76 are connected in pipe 68 between the sump 66 and third reservoir 70. A second diluent collection pan 80 is positioned within evaporator/absorber vessel 60 below the diluent spray header 56 and is connected by a pipe 82 and pump 84 to recirculate diluent directly to the spray header 56.

Also it will be seen that two separate heat exchanger coils 90 and 92 are located within evaporator/absorber vessel 60. Heat exchanger coil 90 is located between the first diluent spray header 56 and collector pan 80 and circulates refrigeration fluid from a refrigeration load such as an office air conditioning system, or the like (not shown). The heat exchanger 92 is positioned between the second absorber solution spray header 62 and the sump 66 and circulates fluid from a heat rejector such as a cooling tower (not shown).

First, second and third reservoirs 40, 50 and 70 respectively, have their outer shells vented to atmosphere (not shown in FIG. 1) in the valve and pump arrangement described. Alternately, they may be vented to the concentrator vessel or to the evaporator/absorber vessel, but they must be elevated above the vessel to which they feed liquid.

Operation of the foregoing system under expected optimum conditions wherein the concentrator is designed to have approximately twice the absorber processing capacity of the evaporator, but to operate for only about one-half of the daily cycle when electric rates are lower, would involve the following characteristics. A relatively weak (dilute) absorbent solution of water and 57½% lithium bromide, stored in the third reservoir 70 at approximately 95° F. (35° C.), is sprayed into the concentrator vessel 10 at a rate to produce a stronger 63% solution at approximately 112° F. (44.4° C.) in the sump 34 which is continuously transferred to the first reservoir 40.

The vessel 10 is maintained at 0.2 inch (5.1 cm.) Hg. absolute and the heat pump compressor 18 and coils 12 and 14 are sized and operated to deliver superheated refrigerant gas at about 145° F. (62.8° C.) to the condenser coil 12, discharge refrigerant liquid at about 127° F. (52.8° C.) to the expansion valve 16 and to return refrigerant gas at about 30° F. (−1.1° C.) to the compressor inlet. Water vapor within the concentrator vessel will condense on the evaporator coil 14 and accumulate in the first collector pan 30 at about 35° F. (1.7° C.) from whence it is stored in the second reservoir 50 so as to be available on demand in the evaporator/absorber vessel 60.

By maintaining the evaporator vessel 60 at the same pressure of 0.2 inch (5.1 cm.) Hg. absolute the liquid water sprayed across the refrigeration heat exchanger 90 will remain at about 35° F. (1.7° C.) yet the available heat of vaporization will be adequate to chill refrigerant in the heat exchanger 90 from an inlet temperature of about 50° F. (10° C.) to an outlet temperature of about 40° F. (4.4° C.). The water vapor is reabsorbed in the strong lithium bromide solution drawn from the first reservoir 40 thereby diluting the solution to about 57½% which is then returned to the third reservoir 70. During reabsorption the solution is cooled by the rejection heat exchanger 92 to about 95° F. (35° C.) so as to maintain the vessel pressure at about 0.2 inch (5.1 cm.) Hg. Normally the rejection heat exchanger 92 may be sized so that 85° F. (29.4° C.) water from a cooling tower, or the like, is adequate to cool the diluted absorbent solution.

Obviously the foregoing system may be sized to meet a wide range of refrigeration loads. In relatively small applications of about five tons refrigeration or less, it will be possible to eliminate external reservoir vessels and to provide sufficient storage capacity for diluent and absorbent liquid solutions in the collector pans 30 and 80 and the sumps 34 and 66 within the respective concentrator and evaporator/absorber vessels 10 and 60, respectively. Each of the three separate reservoirs 40, 50 and 70 shown in the system of FIG. 1, when vented to the atmosphere, may be construed as shown in FIG. 2 to comprise an expandable bladder 100 within a rigid vessel 102 and separate inlet and outlet connectors 104, 106 and a vent 110. Atmosphere venting of the reservoir vessels provides a relatively constant pressure for feeding the control valves, and the bladders provide both a movable partition for fluid volume changes and means for preventing air and/or moisture absorption. It is also possible to combine the three reservoirs by utilizing three separate expandable bladders 100a, 100b and 100c within a single rigid vessel 108 as shown in FIG. 3. The combined reservoir volume will be approximately constant throughout operation of the described system and the total reservoir requirement will be about 1.2 cubic feet for each ton-hour of designed refrigeration capacity.

Other modifications and variations of the aforedescribed invention may be made without departing from the spirit and scope of the invention which is defined in the following claims.

What is claimed is:

1. In an absorption refrigeration process which includes the steps of heating a dilute absorbent solution in a first phase to drive off a diluent to form a concentrated absorbent solution and condensing the diluent and delivering same to a second phase to remove heat from a refrigeration load and reabsorbing the diluent in the concentrated absorbent solution to thereby form a diluted absorbent solution for return to said first phase, the improvement comprising:

maintaining a pressure within said first phase equivalent to the pressure in the second phase so as to minimize absorbent solution temperature differences and eliminate diluent temperature differences; and storing functionally sufficient quantities in liquid form of said concentrated and diluted absorbent solutions and said cold diluent produced in said first and second phases so as to enable said first and second phases to be operable independently timewise of one another.

2. The process of claim 1 wherein said concentrated and diluted absorbent liquids and said liquid diluent are stored in three separate zones.

3. The process of claim 2 wherein at least one of said zones is separated from said first and second phases.

4. The process of claim 1 including the steps of:

producing first liquid streams of said concentrated absorbent solution and cold diluent in said first phase;

storing at least portions of said liquid streams in first and second zones;

removing second liquid streams of each of said concentrated absorbent solution and cold diluent from said first and second zones in quantities to meet demands for same in said second phase;

producing a liquid stream of diluted absorbent solution in said second phase;

storing at least a portion of said liquid stream of diluted absorbent solution in a third zone;

withdrawing said diluted absorbent solution from said third zone for use in said first phase only at intervals when it is required to replenish the concentrated absorbent solution and diluent stored in said first and second zones; and said steps excluding any interchange of heat with any of said absorbent solution streams outside of said zones.

5. The process of claim 1 wherein the absorbent solution is aqueous.

6. The process of claim 1 wherein the absorbent solution contains lithium bromide.

7. The process of claim 1 including the steps of distilling the diluted absorbent solution within said first phase by heating with energy expelled from a heat pump condenser and diluent vapor thereby generated is condensed within said first phase and the heat of condensation is captured and reinjected into the concentration process.

8. The process of claim 1 wherein the diluted absorbent solution is concentrated by heating within said first phase and the diluent is condensed by cooling within said first phase and each of said heating and cooling within said first phase are performed by condensing and evaporating functions of a heat pump connected in series within said first phase to receive a refrigerant gas flow from a compressor located exterior of said first phase.

9. In an improved absorption refrigeration apparatus wherein a dilute absorbent solution is heated within a concentrator vessel to produce a diluent and a concentrated absorbent solution which are delivered to an evaporator/absorber vessel wherein the diluent is heated to release vapors to combine with the concentrated absorbent solution and thereby produce a dilute absorbent solution which is returned to the concentrator vessel, the improvement comprising:

means comprising a system of valves and pumps between said vessels whereby to maintain equal pressure between said vessels; and liquid storing means connected to said vessels for said concentrated absorbent solution, diluent and dilute absorbent solution, said liquid storing means being of sufficient capacity so as to enable operation of said concentrator vessel independently of said evaporator vessel.

10. The apparatus of claim 9 including first and second storing means for retaining at least portions of the concentrated absorbent solution and diluent produced in the concentrator vessel and connected to the evaporator vessel to deliver said concentrated absorbent solution and diluent according to the need occurring in said evaporator vessel; and third storing means for retaining at least a portion of the dilute absorbent solution produced in said evaporator vessel and connected to said concentrator vessel to deliver said dilute absorbent solution as needed to replenish said first and second storing means.

11. The apparatus of claim 9 wherein said liquid storing means is positioned between said concentrator and evaporator vessels.

12. The apparatus of claim 10 wherein said solution storing means are positioned between said concentrator and evaporator vessels and excluding any means for interchanging heat with any of said absorbent solutions outside of said vessels.

13. The apparatus of claim 9 including a heat pump connected to the concentrator vessel, and wherein a condenser coil of said heat pump is positioned within said concentrator vessel to heat the dilute absorbent solution and an evaporator coil of said heat pump is positioned within said concentrator vessel to cool and condense the diluent.

14. The apparatus of claim 13 wherein the heat pump comprises said condenser coil and evaporator coil and a compressor connected in series therewith and power means is connected to drive said compressor.

15. The apparatus of claim 14 wherein said compressor and power means are positioned outside of said concentrator vessel.

16. An improved absorption refrigeration apparatus comprising:

a concentrator vessel maintained at a first pressure;

a sump for concentrated absorbent solution in one section of said concentrator vessel;

a spray header in said section above said sump for introducing dilute absorbent solution into said concentrator vessel;

a first collection pan in another section of said concentrator vessel, said first collection pan to receive diluent released from the absorbent solution in said one section;

a first reservoir connected to said concentrator vessel sump;

a second reservoir connected to said first collection pan;

a third reservoir connected to said spray header in said concentrator vessel;

an evaporator vessel spaced from said concentrator vessel, said evaporator vessel maintained substantially said first pressure;

a diluent spray header located in one section of said evaporator vessel, said diluent spray header being connected to said second reservoir;

an absorbent solution spray header located in another section of said evaporator vessel, said absorbent solution spray header connected to said first reservoir; and a dilute absorbent solution sump in said one section of said evaporator vessel, said sump being connected to said third reservoir.

17. The apparatus claim 16 including flow control valves between each of said reservoirs and the respective spray headers.

18. The apparatus of claim 16 including a heat pump connected to the concentrator vessel, and wherein a condenser coil of said heat pump is positioned in said one section between said sump and said spray header for introducing dilute absorbent solution, and an evaporator coil of said heat pump is positioned in said another section above said first collection pan.

19. The apparatus of claim 18 including a compressor connected in series with said condenser coil and said evaporator coil, said compressor being located outside said concentrator vessel.

* * * * *